United States Patent
Goratti et al.

(10) Patent No.: US 12,501,285 B2
(45) Date of Patent: Dec. 16, 2025

(54) DISTRIBUTED SYSTEM FOR RADIO-LIGHT COMMUNICATIONS

(71) Applicant: Safran Passenger Innovations, Weßling (DE)

(72) Inventors: Leonardo Goratti, Weßling (DE); Elisenda Temprado Garriga, Weßling (DE); Tinku Rasheed, Weßling (DE)

(73) Assignee: SAFRAN PASSENGER INNOVATIONS GERMANY GMBH (DE)

( * ) Notice: Subject to any disclaimer, the term of this patent is extended or adjusted under 35 U.S.C. 154(b) by 264 days.

(21) Appl. No.: 18/266,456

(22) PCT Filed: Dec. 16, 2020

(86) PCT No.: PCT/IB2020/001060
§ 371 (c)(1),
(2) Date: Jun. 9, 2023

(87) PCT Pub. No.: WO2022/129968
PCT Pub. Date: Jun. 23, 2022

(65) Prior Publication Data
US 2024/0049005 A1 Feb. 8, 2024

(51) Int. Cl.
*H04B 10/114* (2013.01)
*H04B 10/11* (2013.01)
(Continued)

(52) U.S. Cl.
CPC ............ *H04W 24/02* (2013.01); *H04B 10/11* (2013.01); *H04B 10/114* (2013.01); *H04W 88/10* (2013.01)

(58) Field of Classification Search
CPC .......................................... H04B 10/114–116
See application file for complete search history.

(56) References Cited

U.S. PATENT DOCUMENTS 10,693,557 B1 * 6/2020 Ayotte ............... H04N 21/2146
2001/0055285 A1 12/2001 Tomoike
(Continued)

FOREIGN PATENT DOCUMENTS

| EP | 2563088 A1 | 2/2013 |
| EP | 2579638 A1 | 4/2013 |

(Continued)

OTHER PUBLICATIONS

International Search Report and Written Opinion for International Application No. PCT/IB2020/001060, dated Aug. 31, 2021, 10 pages.
(Continued)

*Primary Examiner* — Nathan M Cors
(74) *Attorney, Agent, or Firm* — Buchanan Ingersoll & Rooney PC

(57) ABSTRACT

A wireless access point, WAP, for communicating with a user equipment, the WAP comprising a plurality of wireless communication units, an Access Layer Control Unit, ALCU, communicatively coupled to the plurality of wireless communication units and configured to manage the plurality of wireless communication units, wherein a first wireless communication unit of the plurality of wireless communication units communicates through a Radio Frequency, RF spectrum and a second wireless communication unit of the plurality of wireless communication units communicates through a visible or infrared light spectrum.

7 Claims, 2 Drawing Sheets

(51) Int. Cl.
  *H04W 24/02* (2009.01)
  *H04W 88/10* (2009.01)

(56) References Cited

U.S. PATENT DOCUMENTS

| | | | |
|---|---|---|---|
| 2015/0163836 A1 | 6/2015 | Kobayashi et al. | |
| 2017/0041072 A1 | 2/2017 | Rong | |
| 2019/0020427 A1 | 1/2019 | Uchida et al. | |
| 2020/0274632 A1* | 8/2020 | Delame | H04B 10/25 |
| 2023/0246692 A1* | 8/2023 | Kim | H04B 7/022 375/262 |

FOREIGN PATENT DOCUMENTS

| | | |
|---|---|---|
| JP | H10213644 A | 8/1998 |
| JP | 2002007238 A | 1/2002 |
| JP | 2010509831 A | 3/2010 |
| JP | 2013046418 A | 3/2013 |
| JP | 5391320 B1 | 1/2014 |
| JP | 2018528669 A | 9/2018 |
| WO | 2008059504 A2 | 5/2008 |
| WO | 2011151857 A1 | 12/2011 |
| WO | 2017021502 A1 | 2/2017 |
| WO | 2017145358 A1 | 8/2017 |
| WO | 2019182987 A1 | 9/2019 |

OTHER PUBLICATIONS

Wu et al., "Hybrid LiFi and WiFi Networks: A Survey", Arxiv.org, Cornell University Library, Ithaca, NY, Jan. 14, 2020, 25 pages.
Perez-Jimenez et al., "Visible light communication systems for passenger in-flight data networking", 2011 IEEE International Conference on Consumer Electronics, (ICCE), pp. 445-446.
Office Action (Notice of Reasons for Rejection) issued Oct. 22, 2024, by the Japanese Patent Office in corresponding Japanese Patent Application No. 2023-537624 and an English translation of the Office Action. (15 pages).
Office Action (Communication pursuant to Article 94(3) (EPC) issued May 14, 2025, by the European Patent Office in corresponding European Patent Application No. 20 848 963.3-1206. (6 pages).
Office Action (Notice of Reasons for Rejection) issued May 13, 2025, by the Japanese Patent Office in corresponding Japanese Patent Application No. 2023-537624. (5 pages).

* cited by examiner

DISTRIBUTED SYSTEM FOR RADIO-LIGHT COMMUNICATIONS

BACKGROUND OF THE INVENTION

The increased popularity of networked personal devices has resulted in a need to improve the capabilities of such networks. To cater to these needs, wireless communication protocols have evolved such as Wi-Fi, 5G LTE, Bluetooth etc. However, these wireless technologies use adjacent or overlapping radio bands, which can result in higher interference.

The interference tends to increase analogously with the spatial density of the devices communicating through the same RF band, resulting in bottlenecks or reduced performance. As such, networks located in indoor environments such as trains or airplanes, wherein a large number of users are confined in an indoors environment and attempt to access the network at the same time, suffer from increased interference that can severely degrade the performance of those networks. This is partly addressed by increasing the number of base stations to increase capacity and offer more channels for the devices to communicate on.

However, such approaches can often be hard to deploy and manage due to the increased number of devices needed. Furthermore the interference created by transmissions in the RF spectrum can affect the performance of other electronic devices that are used to e.g. navigate the aircraft.

Consequently, there is a need for a networking system that can provide reduced interference and improved performance whilst facilitating network management and deployment.

SUMMARY OF THE INVENTION

According to a first aspect of the invention there is provided a wireless access point, WAP, for communicating with a user equipment, the WAP comprising a plurality of wireless communication units, an Access Layer Control Unit, ALCU, communicatively coupled to the plurality of wireless communication units and configured to manage the plurality of wireless communication units, wherein a first wireless communication unit of the plurality of wireless communication units communicates through a Radio Frequency, RF spectrum and a second wireless communication unit of the plurality of wireless communication units communicates through a visible or infrared Light spectrum.

Advantageously, the wireless access point according to the first aspect of the invention facilitates deployment of a heterogeneous network by integrating in a single wireless access point the necessary equipment to communicate by using both or either of visible light and RF-spectrum electromagnetic waves. Thus, there is a reduced need for separate access points using RF spectrum and separate dedicated access points for visible light communication. Having both the wireless communication units that employ RF spectrum and visible light spectrum in the same device, facilitates offloading network traffic from one wireless link to the other, e.g. in the case where there is a lack of Line-Of-Sight with the WAP due to the movement of the user equipment.

The ALCU of the WAP may be configured to manage the plurality of wireless communication units of its WAP based at least in part on first network measurements associated with the respective user equipment and collected through the respective plurality of wireless communication units. The ALCU uses the first network measurements to improve the communication link of the WAP with the respective user equipment.

Managing the plurality of wireless communication units of the WAP may include improving the Bit Error Rate, BER of the communication link between the WAP and the user equipment, the spectrum efficiency of the communication link between the WAP and the user equipment, the signal bandwidth of the communication link between the WAP and the user equipment, the Signal to Noise Ratio, SNR, of the communication link between the WAP and the user equipment, the Signal-to-interference-plus-noise ratio, SINR, of the communication link between the WAP and the user equipment, balancing the communication load on the first and second wireless communication units, extending the coverage area of the WAP, deliver Single-User and/or Multi-User MIMO capabilities to the user equipment, or a combination thereof.

The first wireless communication unit may be communicatively coupled to one or more RF-end points wherein each RF-end point may comprise at least one antenna for RF communication.

The second wireless communication unit may be communicatively coupled to one or more light-based end points, wherein each light-based end point may comprises at least one visible or infrared light emitter for communication through the visible or infrared Light spectrum.

The one or more RF-end points and/or the one or more light-based end points may be external to the WAP.

According to a second aspect of the invention there is provided a networking system, the networking system comprising a network including a plurality of wireless access points, WAPs, and a Cognitive Control Unit, CCU, communicatively coupled to the ALCU of each WAP in the network and configured to manage the plurality of WAPs.

Advantageously, when compared with known networks that employ either solely RF spectrum links or solely visible light spectrum links, the CCU can adapt the WAPs such that Quality of Service is maintained or even improved based on the different propagation properties of visible-light EM spectrum and RF spectrum. Moreover, the CCU can select the spectrum to be employed based on the interference characteristics of the application scenario, e.g. by ensuring that user equipment near instruments sensitive to RF frequencies only communicate using visible light spectrum.

The CCU may be configured to manage the plurality of WAPs based at least in part on second network measurements associated with each WAP and transmitted to the CCU by the ALCU of each WAP, to improve the performance of the network of the plurality of WAPs.

Managing the plurality of WAPs may include balancing the network load between the WAPs in the plurality of WAPs; configuring WAPs to provide redundancy communication links, for example when there is an increased likelihood of link failure, configuring WAPs to adhere to requirements on quality of service guarantees, optimizing bandwidth allocation between WAPS, applications configuration, configuring RF and Light communication links, assigning pre-defined channels for RF or visible or infrared light spectrum, determining the number of active RF and Light transmitting/receiving elements, forcing a WAP to communicate only through the RF or visible light spectrum with a specific user equipment or a combination thereof.

The CCU may be integrated in one of the plurality of WAPs forming the system.

The CCU may manage the plurality of WAPs by training a neural network based on the collected network measurements from the ALCU of each WAP.

The plurality of WAPs may be communicatively coupled in a star topology and centrally coordinated by a central node that comprises the CCU.

The at least one second wireless communication unit of each WAP may be configured to communicate through the IEEE 802.15.7 or IEEE 802.11bb protocols.

According to a third aspect of the invention there is provided an In-Flight Entertainment and Connectivity, IFEC, system for an aircraft comprising a networking system according to the first aspect of the invention.

BRIEF DESCRIPTION OF THE DRAWINGS

Embodiments of the invention will now be described, by way of non-limiting examples only, with reference to the following accompanying figures, in which.

DETAILED DESCRIPTION OF EMBODIMENTS OF THE INVENTION

The present invention relates to a networking system that employs communication links through both RF and visible light spectrum to alleviate problems experienced by known networks when there is a high density of potentially connected devices.

As an exemplary case of deployment we consider an Inflight Entertainment and Connectivity (IFEC) system for aircraft, although this should not be construed to be a limitation of the invention. The present invention can be used in other indoor or outdoor environments.

Figure 1:
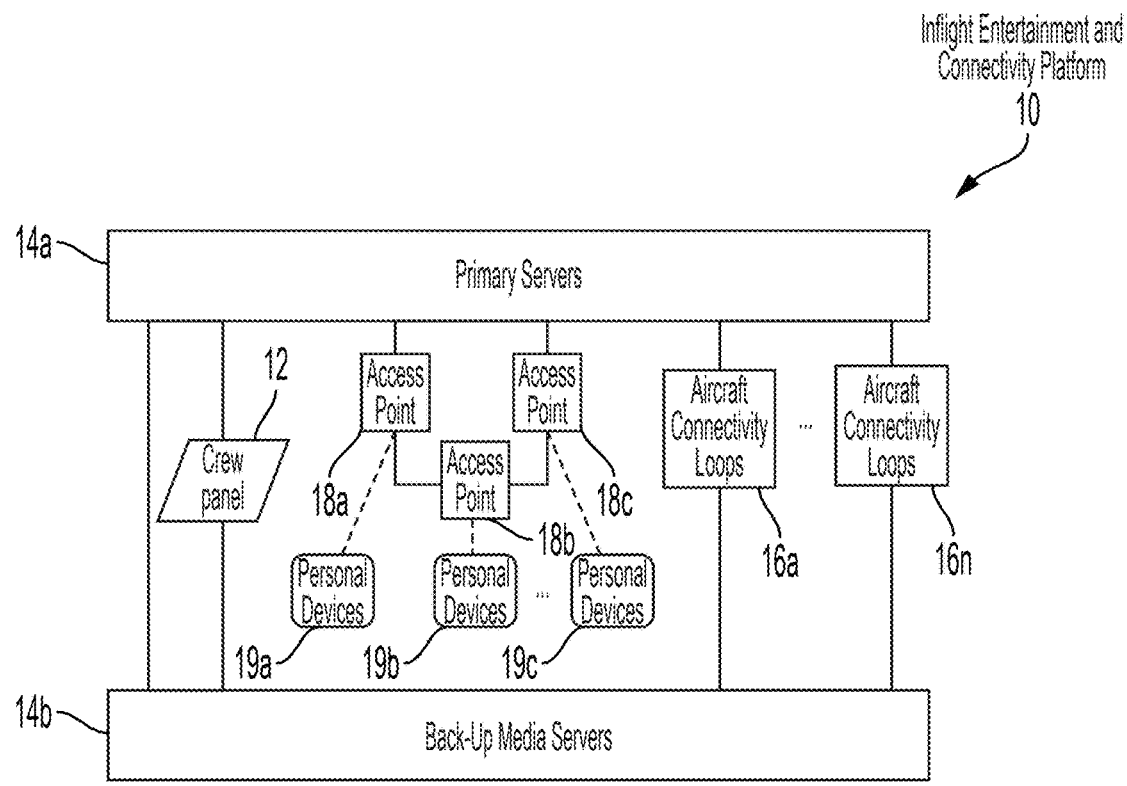
FIG. 1 is a schematic diagram of a system architecture of a known Inflight Entertainment and Connectivity platform.

FIG. 1 schematically illustrates a typical system architecture of a known Inflight Entertainment and Connectivity platform 10. In FIG. 1, dashed lines indicate wireless radio links employing RF spectrum, while solid double lines indicate wired links, e.g. 1 Gigabit Ethernet links. A crew panel 12 is connected through a wired connection to primary and back-up media servers 14a, 14b. Aircraft connectivity loops (16a . . . 16n) may connect different cabin systems, e.g. in-system client devices such as integrated screens on passengers seats for media consumption. The multiple connectivity loops provide resilience against faults, but may in turn make deployment and repairs harder. Access points 18a-18c, coupled through wired means in a daisy chain connection are wirelessly connected to personal devices 19a-19c, using one of different RF communication protocols, e.g. Bluetooth or different WiFi standards. The primary and back-up media servers 14a, 14b are coupled through a wired connection to other aircraft systems (not shown).

The system of FIG. 1 can suffer from increased interference when multiple personal devices in a densely populated space attempt to connect to the access points 18a-18c. Furthermore, to increase the network capacity to accommodate more personal devices, there must be an increase in the number of the access points which in turn increases the overall interference while hinders management and installation due to the large numbers of wired connections required.

Figure 2:
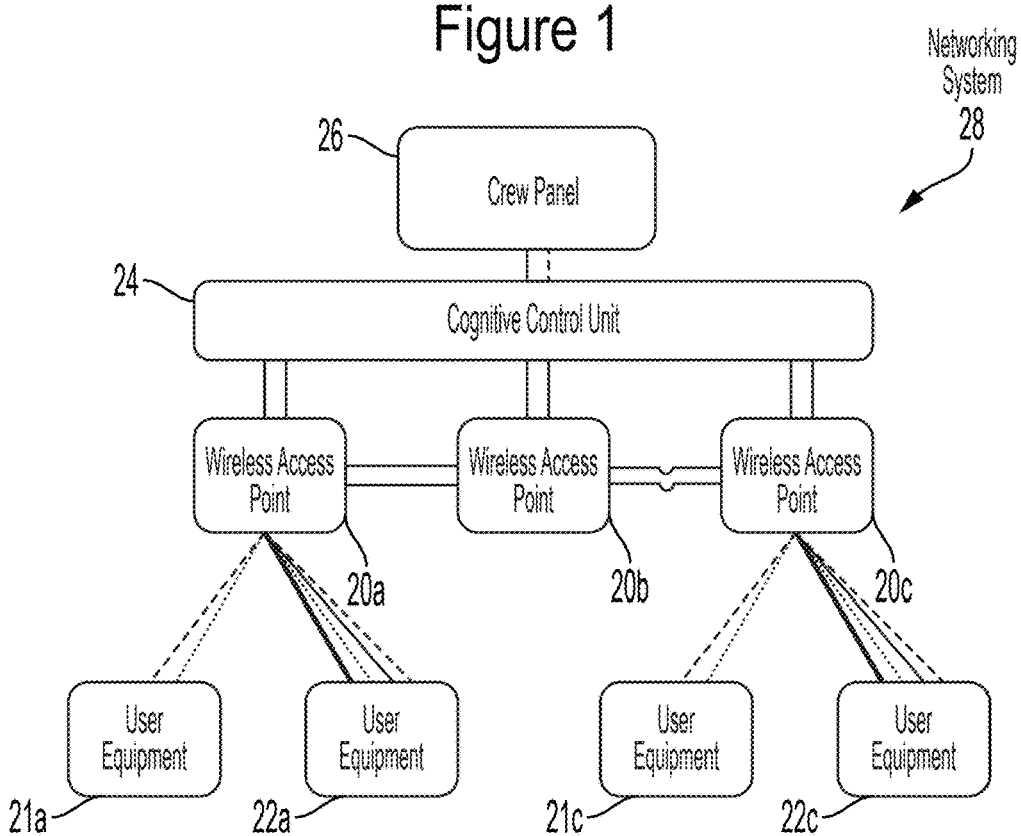
FIG. 2 is a schematic diagram of an Inflight Entertainment and Connectivity platform based on the networking system according to a first aspect of the invention.

FIG. 2 schematically illustrates a novel networking system 28 according to an embodiment of the present invention for an improved an IFEC platform. In the networking system 28, Wireless Access Points, WAPs 20a-20c are coupled to each other to create a network. Each WAP is connected to a Cognitive Control Unit, CCU 24.

The CCU 24 embodies a centralized cognitive engine that receives information from WAPs 20a-20c through any suitable backbone network and communication standard for computer systems. In the embodiment of FIG. 2, the WAPs 20a-20c are communicatively coupled to the CCU through a wireless communication link. However, in other embodiments some or all of the WAPs may be communicatively coupled to the CCU through a wired coupling.

In some embodiments, the WAPs may be connected in a star topology, with the central node comprising the CCU. Advantageously, when the WAPs are connected in star topology, the CCU can, in response to detecting malfunction of a WAP, provision another WAP to take the place of the malfunctioning WAP, ensuring continuity of service.

Each WAP 20a-20c is capable to communicate wirelessly with user equipment through electromagnetic waves that use either the RF or visible light spectrum. A variety of user equipment 21a, 22a, 21c, 22c can be connected to a respective WAP of the network. In the illustrated embodiment, user equipment 21a may be a personal device, e.g. a laptop or tablet that is connected wirelessly to the WAP 20a by communicating in the RF spectrum. User equipment 22a may be e.g. a screen integrated in a passenger seat that is connected wirelessly to the WAP 20a using visible light spectrum. User equipment 21c and 22c may be similar devices, coupled to WAP 20c using either visible light spectrum or RF spectrum. In some embodiments, a user equipment may connect to a WAP by communicating simultaneously through the RF and visible light spectrum. Although in the illustrated embodiment all user equipment are wirelessly connected to their respective WAPs, in other embodiments there may be user equipment that are connected to a WAP through a wired connection.

Each WAP 20a-20c comprises an Access Layer Control Unit, ALCU (not illustrated in FIG. 2). The ALCU may be communicatively coupled to the CCU 24 over different wired mediums like Ethernet or optical fibre. Alternatively, the ALCU may be wirelessly communicatively coupled to the CCU 24. The ALCU may transmit to the CCU 24 network measurements that contain information related to the communication links between each WAP 20a-20c and each user equipment communicatively coupled to each respective WAP. In the illustrated embodiment of FIG. 2, the ALCU of WAP 20a collects information related to the communication link between the WAP 20a and the user equipment 21a such as Bit Error Rate, BER of the communication link; the spectrum efficiency of the communication link; the signal bandwidth of the communication link; the Signal to Noise Ratio, SNR, of the communication link; the Signal-to-interference-plus-noise ratio, SINR, of the communication link and or the received signal strength of the communication link. The ALCU of WAP 20a also collects information related to the communication link between the WAP 20a and the user equipment 22a. The ALCU can collect this information irrespective of whether the communication link is established in RF or visible light spectrum. Similarly, the ALCU of WAP 20c collects information for the communication links with the user equipment 21c, 22c.

The CCU 24 collects the network measurements from the ALCU of each WAP to build a model for the network. The model may comprise any of the information recited above that can be used to quantify the performance of each individual communication link, and holistically of the networking system 28. The information is used to train an Artificial Intelligence (AI) network or entity. In other embodiments the information may be used to train a Machine Learning (ML) network. The AI/ML network can generate configuration information that is transmitted to the WAPs to improve the performance of the network. The CCU receives network information from multiple ALCUs thus performing a periodic monitoring of the overall network infrastructure. Network information is received periodically, with a period in the order of milliseconds. In other embodiments, information can be received over longer periods, e.g. with a period lasting seconds or even hours. Increasing the time between subsequent transmission of network information from the ALCUS to the CCU may reduce the amount of resources consumed in the monitoring process, and increase the battery life of the WAPs. The CCU applies various control loop or feedback algorithms on the available measurements to determine global optimums for network configuration, wherein the optimums may comprise any of network throughput maximization, fairness in resource allocation, traffic prioritization, number of active RF/Light transmitting and receiving elements, etc. Examples of network measurements include the number of clients per WAP and technology (RF/Light), clients' capabilities, application being used, overall throughput, physical WAP failure rates and the like.

Improving the performance of the network of the plurality of WAPs may comprise balancing the network load between the plurality of WAPs. Measuring the network load on a WAP may rely on a various metrics such as throughput per interface (including received and transmitted packets and bytes/second on a per client basis and/or respective traffic class information), number of connected clients to an interface (RF or visible/infrared light), received signal strength (in RF and/or visible/infrared light spectrum), energy consumption, number of faulty communication links, etc. In some embodiments, improving the performance of the network may comprise configuring WAPs to provide redundancy communication links when there is an increased likelihood of link failure, for example when there is an indication based on the SNR of a communication link that Line of Sight will soon be lost, and thus the communication should rely on RF spectrum. In some embodiments, improving the performance may comprise adjusting the number of active radio and visible/infrared light transmitting/receiving elements in a WAP, determining the number of active data streams that can be activated without excessive interference in both RF and visible/infrared light coverage areas surpassing predefined respective tolerance thresholds (i.e. maximizing the benefits of a MIMO architecture), determining the number of active logical networks in both radio and visible/infrared light spectrum, etc. In some embodiments, improving the performance may comprise forcing a WAP to communicate only through visible light spectrum with a specific user equipment to reduce interference on the RF spectrum. Some embodiments may comprise combination of the above improvements.

Although in the embodiment illustrated in FIG. 2 the CCU 24 employs a neural network to generate the WAP configuration information, other embodiments may not comprise a neural network. Instead or in addition, in some embodiments the CCU 24 may generate WAP configuration information based on anomaly detection algorithms, reinforcement learning algorithms interference reduction algorithms or game theoretical algorithms, depending on the aspect of the network performance that is desired to be improved.

The WAPs 20a-20c receive the configuration information from the CCU 24 and adjust their functionality accordingly to improve the performance of the network in the desired manner.

In the embodiment of FIG. 2, the CCU 24 is also coupled to terminal 26. Terminal 26 may be a crew panel similar to crew panel 12 in FIG. 1, that enables a user to interact with the IFEC platform. In some embodiments, terminal 26 may be a personal device that communicates wirelessly with the CCU 24. Yet in other embodiments, e.g. in an aircraft environment, terminal 26 may be a panel fixed to the aircraft.

In the embodiment of FIG. 2, the CCU 24 is part of a server unit, that is coupled to the WAPs 20a-20c. However in other embodiments the CCU 24 may be integrated in one of the WAPs, either in software or hardware.

Figure 3:
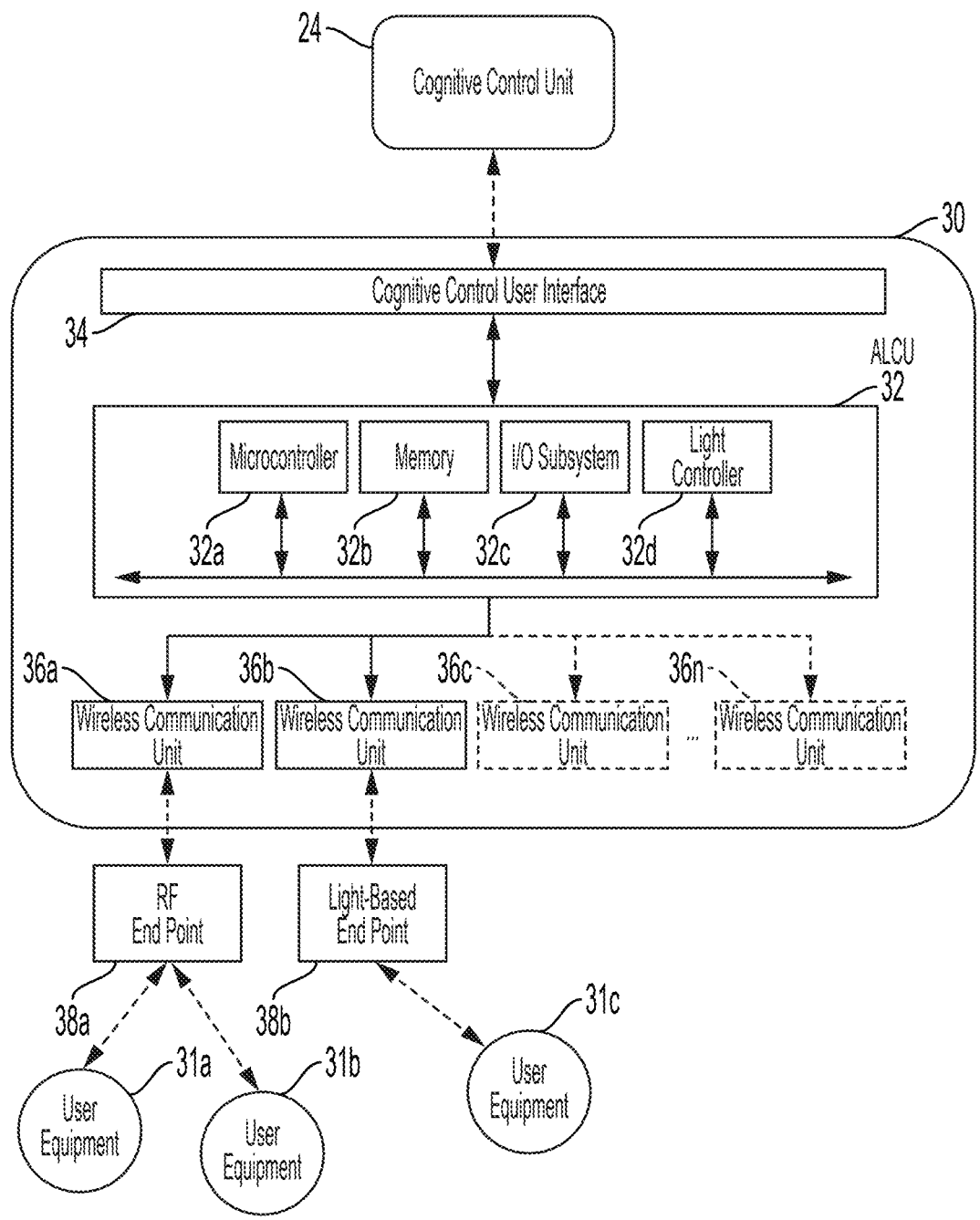
FIG. 3 is a schematic diagram of a wireless action point according to the first aspect of the invention.

FIG. 3 schematically illustrates a WAP 30 such as the WAP 20a-20c that form part of the networking system 28. One or more WAPs can be deployed in an indoor environment such as the interior of an aircraft to enable clients' devices with wireless connectivity for data communications and to access the networking system 28. WAP is wirelessly communicatively coupled to user equipment 31a, 31b and 31c.

The WAP 30 comprises an ALCU 32. The ALCU 32 comprises a microcontroller 32a for executing machine readable instructions and computer programs, a memory 32b for storing data and executable computer programs, an I/O subsystem 32c a I/O component for controlling peripheral devices connected to the WAP 30 and optionally a light controller 32d for controlling the hardware responsible for communications through the visible light spectrum.

The WAP 30 also comprises a Cognitive Control Unit Interface, CCUI 34 that enables coupling the ALCU 32 to the CCU 24. The CCUI 34 provides a software conversion layer to enable interaction with standardized open interfaces such as RESTFull that enable information reporting to a system administrator and/or to trained personnel by means of a suitable management interface (which may be a Graphical User Interface or a Command Line Interface). Although in the embodiment of FIG. 3 the CCUI is illustrated as a distinct component to the ALCU, in some embodiments the CCUI may be part of the ALCU, e.g. implemented in software running on the microcontroller 32a.

The WAP 30 also comprises wireless communication unit 36a configured to communicate with user equipment 31a-31b through the RF spectrum. Wireless communication unit 36a may comprise some or all of the necessary modules that form part of an RF transceiver, e.g. a modulator, a power amplifier, an impedance matching circuit etc. Wireless communication unit 36a is coupled to the ALCU 32 and to RF end point 38a. Although in the embodiment illustrated in FIG. 3 the wireless communication unit 36a is connected to only one RF end point, in other embodiments wireless communication units arranged to communicate through the RF spectrum may be coupled to multiple RF end points.

RF end point 38a comprises a plurality of antennas for radio communications. RF end point 38a may also comprise a controller (not shown) arranged to provide signals to the plurality of antennas to enable Single-User or Multi-User MIMO communication links with the user equipment 31a and/or the user equipment 31b. In some embodiments, RF end point 38a may comprise circuits for physical layer signal processing and/or to implement lower MAC protocols for accessing the radio channel.

In the embodiment illustrated in FIG. 3 the RF end point 38a is external to the WAP and coupled to the WAP 30 though wired means, e.g. Ethernet or optical fibre. However, in other embodiments RF endpoint 38a may be integrated in the WAP 30.

The WAP 30 also comprises wireless communication unit 36b configured to communicate with user equipment 31c through the visible light spectrum. Wireless communication unit 36b may comprise some or all of the necessary modules that form part of an transceiver using visible light spectrum, e.g. an ADC or a DAC, a baseband digital signal modulator/demodulator, and light emitters (LED and/or infrared diode) with respective light drivers. Wireless communication unit 36b is coupled to the ALCU 32 and to light-based end point 38b. Although in the embodiment illustrated in FIG. 3 the wireless communication unit 36a is connected to only one light-based end point, in other embodiments wireless communication units arranged to communicate through the visible light spectrum may be coupled to multiple light-based end points.

Light-based end point 38b comprises a plurality of light emitters for radio communications. The light emitters may be lamps or LEDs arranged to emit visible light, i.e. light with a wavelength in the range of approximately 370 to 800 nm. Light-based end point 38b may also comprise a controller (not shown) arranged to provide signals to the plurality of light emitters to enable Single-User or Multi-User MIMO communication links with the user equipment 31c. Light-based end point 38b comprises light sensors (not shown), to enable bidirectional transmissions through the visible light spectrum. However, in other embodiments, light-based end point 38b may not comprise sensors to reduce the size and complexity of the light-based end points, and thus communications through the visible light spectrum may be only downlink, i.e. from the WAP 30 to the user equipment 31c. In some embodiments, light-based end point 38b may comprise circuits for physical layer signal processing and/or to implement lower MAC protocols for accessing the light-based channel. In some embodiments, light-based end point 38b comprises drivers for the light emitters, as well as any other required hardware that enable the light emitters to radiate in either visible light or infrared spectrum.

In the embodiment illustrated in FIG. 3 the light-based end point 38b is external to the WAP 30 and coupled to the WAP 30 though wired means, e.g. Ethernet or optical fibre. Advantageously having the light-based end points external to the WAP removes the need to house the light emitters in the casing of the WAP 30. This in turn enables reducing the size of the WAP, resulting in a more compact WAP. Such a compact WAP facilitates deployment and installation of the networking system.

Although in FIG. 3 the RF end point 38a and the light-based end point 38b are illustrated as being external to the WAP, in other embodiments they can be integrated in the WAP, resulting in a monolithic device. In such a case, all the WAP comprises a single housing which contains the CCUI 34, the ALCU 32, the wireless communication units 36a-36b, the RF end point 38a and the light-based end point 38b. Advantageously, having a single WAP 30 able to communicate in both RF spectrum and visible light, simplifies the deployment and management of the networking system. Furthermore, having a single WAP 30 able to communicate in both RF spectrum and visible light, enables the CCU 24 to manage the network comprising the plurality of same WAPs in a more efficient and optimized manner.

Although WAP 30 is illustrated in FIG. 3 as comprising only wireless communication units 36a and 36b, in other embodiments of the invention, WAP 30 may comprise multiple wireless communication units 36c . . . 36n.

The ALCU 32 is responsible for local configuration and optimization of the wireless communication technologies supported by WAP 30. The ALCU 32 is configured to manage wireless communication units, 36a and 36b based at least in part on network measurements associated with user equipment 31a-31c. The network measurements are collected through by wireless communication units 36a and 36b. The ALCU configures the wireless communication units 36a, 36b to improve the communication links between the WAP 30 and any of user equipment 31a-31c. In some embodiments the ALCU may determine that the user equipment 31c has lost line of sight with the light-based end point 38b, and may configure the wireless communication unit 38a to establish a communication link through RF spectrum with the user equipment 31c.

In some embodiments, improving the communication link between a WAP 30 and any of user equipment 31a-31c may comprise improving the Bit Error Rate, BER of the communication link. In some embodiments, improving the communication link between a WAP 30 and any of user equipment 31a-31c may comprise improving the spectrum efficiency of the communication link. In some embodiments, improving the communication link between a WAP 30 and any of user equipment 31a-31c may comprise improving the signal bandwidth of the communication link. In some embodiments, improving the communication link between a WAP 30 and any of user equipment 31a-31c may comprise improving the Signal to Noise Ratio, SNR, of the communication link. In some embodiments, improving the communication link between a WAP 30 and any of user equipment 31a-31c may comprise improving the Signal-to-interference-plus-noise ratio, SINR, of the communication link. In some embodiments, improving the communication link between a WAP 30 and any of user equipment 31a-31c may comprise balancing the communication load on the first and second wireless communication units. Balancing the communication load on the first and second wireless communication units may comprise determining the communication load on the first or second wireless communication unit based on information about number of connected clients per interface (RF or visible/infrared light), traffic class requested by a client (i.e. QoS parameters of the application), aggregate downstream traffic per interface (RF or visible/infrared light) that can be measured in terms of aggregate bytes/second, signal quality map for clients connected to an interface (RF or visible/infrared light), interference map in both RF and visible/infrared light spectrum, traffic scheduling policy, detection of faulty transmitting/receiving elements and/or WAPs, etc. In some embodiments, improving the communication link between a WAP 30 and any of user equipment 31a-31c may comprise extending the coverage area of the WAP 30 by using the wireless communication unit with the greater range. In some embodiments, improving the communication link between a WAP 30 and any of user equipment 31a-31c may comprise managing the wireless communication units 36a, 36b to deliver Single-User and/or Multi-User MIMO capabilities to the respective user equipment. In some embodiments, improving the communication link between a WAP 30 and any of user equipment 31a-31c may comprise any combination of the above.

Although the embodiments of the invention described above describe communication units that transmit electromagnetic waves in the visible light spectrum, it will be appreciated by a skilled individual that other embodiments of the invention may instead transmit in the infrared light spectrum.

The invention claimed is:

1. A networking system comprising:
a plurality of wireless access points, WAPs, for communicating with a user equipment, each WAP comprising:
a plurality of wireless communication units;
an Access Layer Control Unit, ALCU, communicatively coupled to the plurality of wireless communication units and configured to manage the plurality of wireless communication units wherein
a first wireless communication unit of the plurality of wireless communication units communicates through a Radio Frequency, RF spectrum; and
a second wireless communication unit of the plurality of wireless communication units communicates through a visible or infrared Light spectrum,
wherein the ALCU is configured to manage the plurality of wireless communication units based at least in part on first network measurements associated with the user equipment communicatively coupled to the WAP and collected through the plurality of wireless communication units,
wherein the ALCU collects information related to a communication link between the WAP and a user equipment, the information including one or more of:
the Bit Error Rate, BER of the communication link:
the spectrum efficiency of the communication link;
the signal bandwidth of the communication link;
the Signal to Noise Ratio, SNR, of the communication link;
the Signal-to-interference-plus-noise ratio, SINR, of the communication link; and
the received signal strength of the communication link,
and wherein the ALCU is configured to control operation of the plurality of wireless communication units based on the collected information to improve one or more of:
the Bit Error Rate, BER;
the spectrum efficiency:
the signal bandwidth;
the Signal to Noise Ratio, SNR; and
the Signal-to-interference-plus-noise ratio, SINR; and
a Cognitive Control Unit ("CCU") communicatively coupled to the ALCU of each WAP and configured to manage the plurality of WAPs,
wherein the CCU is configured to manage the plurality of WAPs based at least in part on second network measurements associated with each WAP and transmitted to the CCU by the ALCU of each WAP, to improve the performance of the network of the plurality of WAPs,
wherein the CCU is arranged to receive from each ACLU the collected information related to the respective communication link, and wherein the CCU is configured to control operation of the plurality of WAPS based on the received collected information to improve one or more of:
the balance of the network load between the plurality of WAPs;
the configuration of the WAPs to provide redundancy communication links; and
the number of active radio and visible/infrared light transmitting/receiving elements in a WAP.

2. The networking system of claim 1, wherein the CCU is integrated in one of the plurality of WAPs forming the system.

3. The networking system of claim 1, wherein the CCU manages the plurality of WAPs by training a neural network based on the information collected from the ALCU of each WAP.

4. The networking system of claim 1, wherein the plurality of WAPs are communicatively coupled in a star topology and centrally coordinated by a central node that comprises the CCU.

5. An In-Flight Entertainment and Connectivity ("IFEC") system for an aircraft comprising a networking system according to claim 1.

6. The networking system of claim 1, wherein:
the first wireless communication unit is communicatively coupled to one or more RF-end points wherein each RF-end point comprises at least one antenna for RF communication; and
the second wireless communication unit is communicatively coupled to one or more light-based end points, wherein each light-based end point comprises at least one visible or infrared light emitter for communication through the visible or infrared Light spectrum.

7. The networking system of claim 1, wherein the one or more RF-end points and/or the one or more light-based end points are external to the WAP.

* * * * *